United States Patent [19]

Pflaum et al.

[11] Patent Number: 5,003,817

[45] Date of Patent: Apr. 2, 1991

[54] APPARATUS AND A METHOD FOR TESTING OF SYNCHRONIZING SYSTEMS

[75] Inventors: Hermann Pflaum, Maisach; Richard Strehler, Chieming, both of Fed. Rep. of Germany

[73] Assignee: Carl Hurth Maschinen- und Zahnradfabrik GmbH & Co., Munich, Fed. Rep. of Germany

[21] Appl. No.: 482,307

[22] Filed: Feb. 20, 1990

[30] Foreign Application Priority Data

Feb. 22, 1989 [DE] Fed. Rep. of Germany ....... 3905333

[51] Int. Cl.$^5$ ........................................... G01M 19/00
[52] U.S. Cl. ................................................. 73/118.1
[58] Field of Search ........................ 73/118.1, 162, 10

[56] References Cited

U.S. PATENT DOCUMENTS 4,849,888  7/1989  Seto .................................. 364/424.1

FOREIGN PATENT DOCUMENTS 3535103  4/1987  Fed. Rep. of Germany .
315079  9/1971  U.S.S.R. .............................. 73/118.1

OTHER PUBLICATIONS

ATZ Automobiltechnische Zeitschrift 83rd year, (1981) No. 5, pp. 227 to 230.

Primary Examiner—Jerry W. Myracle
Attorney, Agent, or Firm—Flynn, Thiel, Boutell & Tanis

[57] ABSTRACT

An apparatus and a method for the testing of synchronizing devices. In contrast to a conventional apparatus, in which only one rotating transmission gear or rather its synchronizing cone cooperates with a nonrotating synchronizing ring, it is now possible to test a complete synchronizing device consisting of two transmission gears, two synchronizing rings and one gear-shift sleeve with a hub. A transmission gear is fixedly connected to a rigid frame, the other transmission gear is connected to the drive through a drive shaft. The hub with the gear-shift sleeve is coupled with a flywheel mass on the driven side. The flywheel mass on the driven side is during a first shifting operation connected to the drive and is accelerated to the driving speed for testing. The flywheel mass now rotating at the driving speed is then again delayed until standstill through the synchronizing device during a second shifting operation.

11 Claims, 2 Drawing Sheets

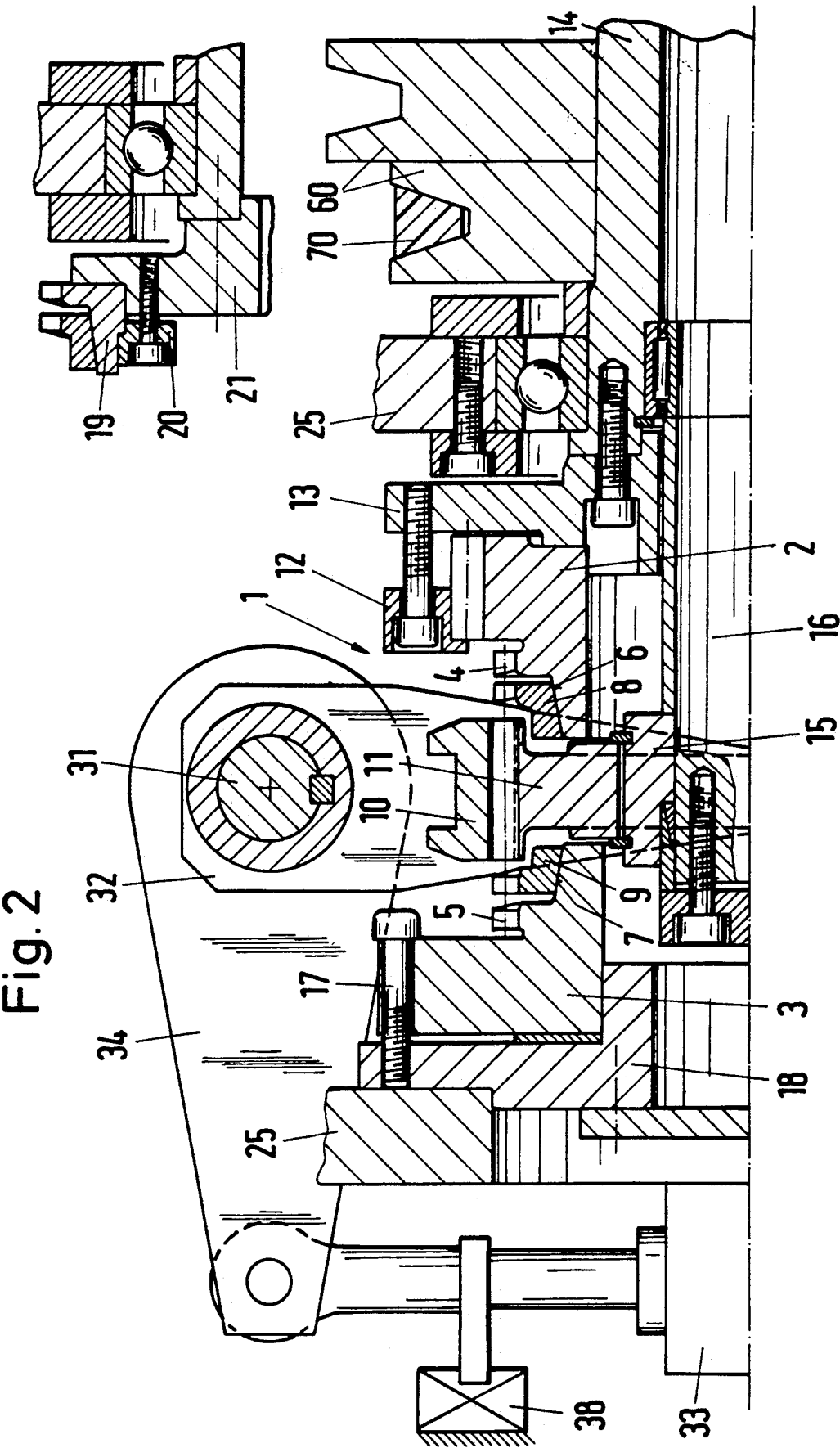

APPARATUS AND A METHOD FOR TESTING OF SYNCHRONIZING SYSTEMS

FIELD OF THE INVENTION

The invention relates to a method for the testing of synchronizing systems and to an apparatus therefor.

BACKGROUND OF THE INVENTION

The invention starts out from a known apparatus for measuring the magnitudes relevant for a synchronizing device in gear-shift mechanisms as it is described in DE 35 35 103 A1. The known apparatus permits only measurements with a transmission gear including a synchronizing cone and with an associated synchronizing ring. These parts are mounted in suitable mountings, one being driven rotationally and the other one then being pressed thereagainst with a preselected axial force and the so-called synchronizing cone torque is thereby measured. More extensive measurements are not intended. One disadvantage of the known apparatus is also that—contrary to the information in the description—the measurement does not occur in the original assembly of the synchronizing device; because the parts (transmission gear and synchronizing ring) having the external and the internal cone are—different than in a gear-shift mechanism—force-guided through their mountings.

Therefore the basic purpose of the invention is to provide an apparatus of the mentioned type so that it is suited for continuous shifting tests on complete synchronizing systems for gear-shift mechanisms, the arrangement of the parts of the synchronizing devices corresponding substantially with the arrangement in the gear-shift mechanism. The continuous shifting tests are thereby able to be carried out both for the production development, for example examining the lifetime of the synchronizing parts having different design parameters and/or different materials, lubricants including additives and temperatures, and also for monitoring quality control of the synchronizing parts and/or lubricants including additives. Furthermore, a method suited to be carried out using this apparatus is also to be provided.

SUMMARY OF THE INVENTION

An apparatus and a method for the testing of synchronizing devices. One of two transmission gears is fixedly connected to a rigid frame, the other transmission gear is connected to the drive through a drive shaft. The hub with the gear-shift sleeve is coupled with a flywheel mass on the driven side. The flywheel mass on the driven side is during a first shifting operation connected to the drive and is accelerated to the driving speed for testing. The flywheel mass now rotating at the driving speed is then again delayed until standstill through the synchronizing device during a second shifting operation.

BRIEF DESCRIPTION OF THE DRAWINGS

The invention will be described in connection with one exemplary embodiment shown in the drawings, in which:

FIG. 2 is an enlarged illustration showing the mounting of the synchronizing system with a modified design of the apparatus;

FIG. 3 shows the mounting of a gear-shift ring in place of a complete transmission gear analogous to FIG. 2.

DETAILED DESCRIPTION

Figure 1:
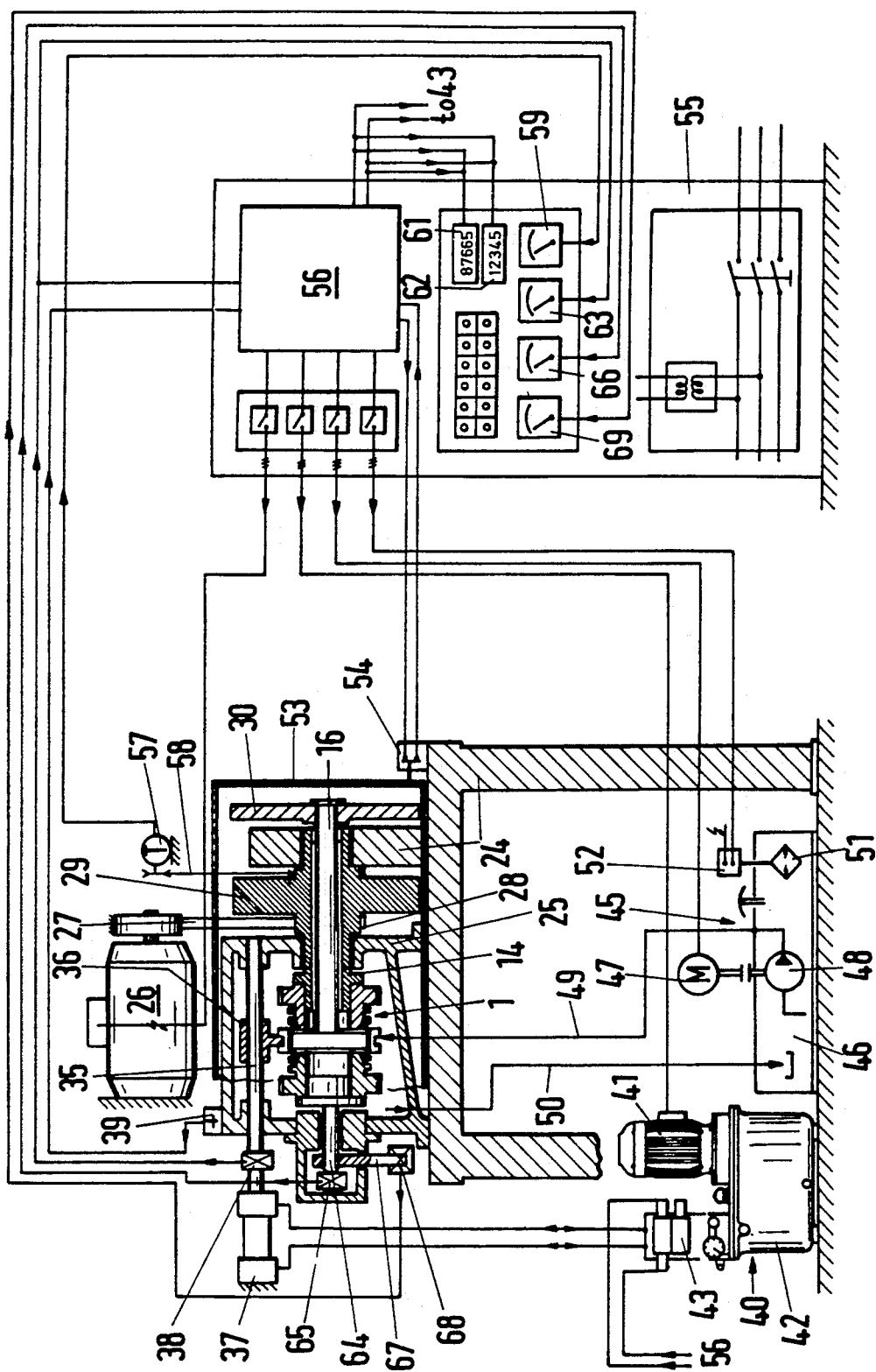
FIG. 1 shows the apparatus of the invention in a partially sectioned front view.

The synchronizing system 1 to be tested is illustrated in FIG. 2. It consists of first and second transmission gears 2 and 3, which aside from their running tooth system have a clutch tooth system 4, 5, and each carry one synchronizing ring 8, 9 on synchronizing cones 6, 7. A gear-shift sleeve 10 sits axially movably on a hub or carrier 11.

The first transmission gear 2 is connected to an adapter 13 by means of a guard ring 12. The adapter 13 is fastened to a hollow drive shaft 14. The hub 11 carrying the gear-shift sleeve 10 is nonmovably mounted on a driven shaft 16 by means of an adapter sleeve 15. The driven shaft 16 is guided through the interior of the hollow drive shaft 14. The second transmission gear 3 is held in a mounting adapter 18 by means of screws 17 guided through the tooth gaps of its running tooth system. The mounting adapter 18 is fastened to a housing 25, which is part of a frame 24, which will be discussed later on. The adapters 13, 15, 18 are adapted to the parts of the synchronizing system 1, which parts are connected to the adapters, and can be exchanged with other adapters adapted to the parts of another synchronizing system. Thus, the testing apparatus can be utilized for many different designs and sizes of synchronizing systems. In place of the hub 11 and the adapter 15, it is also possible to use an adapter uniting these two parts, onto which adapter the gear-shift sleeve 10 can be directly mounted. The connection of the two transmission gears 2, 3 with their adapters 13, 18 can also be done in a different manner.

The clutch tooth system 4, 5 in transmission gears is for manufacturing reasons often mounted on a clutch ring 19, which is then fixedly connected, for example through electronic beam welding, to the actual gear. It is also possible in such cases to use in place of the complete transmission gear only the clutch ring 19 for the testing of the synchronizing system 1, as this is shown in FIG. 3. The clutch ring 19 is connected to an adapter 21 by means of a guard ring 20 resting on an inner projection of the clutch ring 19. A further clutch ring can be connected to the housing 25 in a similar manner.

The drive shaft 14 is supported in the frame 24 or rather the housing 25 (FIG. 1). The drive shaft 14 is driven by an electric motor 26 through a toothed belt 27 and a drive pulley 28 secured to the shaft 14 for this purpose. A flywheel mass 29 is furthermore mounted on the drive shaft 14. The driven shaft 16 is supported inside the drive shaft 14, with the bearing, which is the right bearing in FIG. 1, also being able to be received in the frame 24. A flywheel mass 30 is mounted on the free end of the driven shaft 16. A shift fork 32 (FIG. 2) is mounted on a gear-shift lever supporting shaft 31 extending transversely with respect to the driven shaft 16, which shift fork 32 operatively and drivingly cooperates with the gear-shift sleeve 10. A hydro-cylinder 33 is connected to a lever 34 mounted fixed against relative rotation on the gear-shift lever supporting shaft 31 and causes a swinging movement of the gear-shift lever supporting shaft 31 and thus of the shift fork 32, which thereby moves the gear-shift sleeve 10 to the right or to the left and thus causes a shifting and synchronizing operation.

In place of the swingable shift fork 32, it is also possible to provide a shift fork 36 which is movable parallel with respect to the driven shaft 16, as this is shown in FIG. 1. The shift fork 36 is mounted on a gear-shift bar 35 movably supported in the frame 24 or the housing 25 and extends parallel with respect to the driven shaft 16 and operated by a hydro-cylinder 37.

A limit-value switch 38 is provided between the hydro-cylinder 33 and the lever 34, just like between the hydro-cylinder 37 and the gear-shift bar 35, which limit-value switch turns off the testing apparatus upon exceeding a pregiven shifting force in order to protect against the danger of damage due to an overload. A limit-value switch 39 (FIG. 1) arranged on the frame 24 or the housing 25 serves the same purpose, which limit-value switch 39 turns off the apparatus upon exceeding a pregiven magnitude of oscillation. The housing 25 is open on at least one side to permit the installation and removal of the synchronizing device 1 and the viewing of the testing operation. The opening can be closed off by a cover member 53, for example a sliding door, provided with an electric limit switch 54 preventing a starting up of the testing apparatus when the cover member is open.

A hydraulic supply device 40 is provided to supply the hydro-cylinders 33, 37 and a lubrication supply device 45 is provided to supply the synchronizing system 1 to be tested with the necessary lubricating oil. Both devices 40, 45 are part of the testing apparatus. The hydraulic supply device 40 includes among others a motor 41 for a pump arranged in an oil reservoir 42 and a so-called automatic control device 43. The lubrication supply device 45 consists substantially of an oil reservoir 46 from which a pump 48 driven by a motor 47 moves the oil through a line 49 into the housing 25 from where it freely returns to the reservoir through a line 50. To simulate various operating stages, the oil can be heated up, for which purpose one or more heating elements 51 and a thermostat 52 are provided.

All electrical devices, including a programmable digital control 56 and diverse indicating devices, are stored in a control panel 55.

The testing procedure is as follows. When the synchronizing system 1 is installed as described above and the cover member 53 is closed, the electric motor 26 is started and the drive shaft 14 is rotated. The speed of the shaft 14 is measured by a tacho-alternator 57 connected to the drive shaft 14 through a belt drive schematically shown at 58 and is indicated on an analog speed indicator 59 on the control panel 55. The electric motor 26 is a two-speed three-phase asynchronous motor and provides two different speeds of operation. If, in place of the toothed belt 27 schematically illustrated in FIG. 1, a V-belt 70 is utilized and in place of the drive pulley 28 a stepped drive pulley 60 is utilized, as shown in FIG. 2, then four different speeds are even possible. The speed of the drive shaft 14 is stabilized by the flywheel mass 29. The drive shaft 16 together with its flywheel mass 30 is coupled with the drive and is accelerated to the driving speed by moving the gear-shift sleeve 10 to the right (referred to FIGS. 1 and 2) in a first shifting and synchronizing operation. The driven shaft 16 rotating at the driving speed together with its flywheel mass 30 is coupled with the frame-fixed transmission gear 3 or its clutch ring is coupled with the clutch tooth system 6 and is slowed down until it stands still in a subsequent second shifting and synchronizing operation, for which the gear-shift sleeve is moved all the way to the left.

The shifting operations are started time-dependently by the automatic control device 43 and are carried out by the hydro-cylinder 33 through the lever 34 and the shift fork 32 or through the hydro-cylinder 37 and the shift fork 36. The number of shifting operations can be set freely selectable. The total number of shifting operations yet to be carried out is indicated on a subtracting pre-select counter 61. An adding counter 62 indicates the number of shifting operations having been carried out. A shifting-force indicator 63 is also provided on the control panel 55, which shifting-force indicator 63 is connected to the limit-value switch 38.

To determine additional test data it is possible to further enlarge the mounting 18 for the transmission gear 3 compared with the design shown in FIG. 2. The mounting 18 has an axial pin 64 in FIG. 1, which axial pin 64 acts onto a test-data receiver 65 to detect the occurring axial forces, which can be read on an analog indicator 66. The pin 64 is connected to a lever 67 supported in a test-data receiver 68. The torque occurring in the synchronizing device 1 is detected in this manner and is indicated on an analog indicator 69.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In an apparatus for the testing of synchronizing systems designated for use in gear-shift mechanisms in vehicle transmissions and for the purpose of determining factors influencing at least one of performance, design, materials , lubricants and temperature, said apparatus including:
 (a) at least one of a first transmission gear and a first clutch ring having a clutch tooth system and a first synchronizing cone thereon, and a first synchronizing ring mounted on said first synchronizing cone;
 (b) a second transmission gear arranged coaxially with respect to said at least one of said first transmission gear and said first clutch ring and having a clutch tooth system and a second synchronizing cone thereon, and a second synchronizing ring mounted on said second synchronizing cone, said first and second synchronizing cones being oriented on mutually opposing sides of said at least one of said first transmission gear and said first clutch ring and said second transmission gear;
 (c) a gear-shift sleeve means coaxially arranged between said first and second synchronizing cones, and mounted on a shaft fixed against rotation, however, being axially movable, said gear-shift sleeve means operatively cooperating with a selected one of said first and second synchronizing rings and clutch tooth systems;
 (d) a rotatable drive shaft;
 (e) a rotary drive means for said drive shaft;
 (f) a rotatable driven shaft having a first flywheel mass connected thereto and being rotatable therewith;
 (g) means for effecting a back and forth movement of said gear-shift sleeve means into and out of coupling engagement with a selected one of said first and second synchronizing cones to cause an alternate coupling of said driven shaft to said drive shaft, to effect a driven rotation of said driven shaft, and said driven shaft to said fixed shaft, to effect a stoppage of the rotation of said driven shaft;

(h) and collecting and evaluating means for collecting and evaluating relevant data, the improvement wherein:

(i) a frame is provided;

(j) said at least one of said first transmission gear and said first clutch ring having said first synchronizing cone thereon being exchangeably arranged at one end of said drive shaft, said drive shaft being rotatably supported in said frame and having a second flywheel mass affixed to an opposite end thereof;

(k) at least one of said second transmission gear and a second clutch ring on said second transmission gear having said second synchronizing cone mounted thereon being supported fixed against rotation, however, exchangeably on a receiving means fixed to said frame, said at least one of said first transmission gear an d said first clutch ring and said second transmission gear and said second clutch ring being arranged and spaced from one another in accordance with their installed arrangement and spacing in the designated gear-shift mechanism; and (l) said gear-shift sleeve means being exchangeably arranged on an end of said driven shaft which is remote from said first flywheel mass.

2. The apparatus according to claim 1, wherein said drive shaft is hollow, and wherein said driven shaft is guided through said hollow drive shift such that said first and second flywheel masses are oriented at mutually adjacent ends of said drive shaft and said driven shaft and one the same side of the synchronizing system to be tested.

3. The apparatus according to claim 1, wherein a shift fork is mounted on a gear-shift lever shaft oriented perpendicularly with respect to and spaced from said driven shaft, which gear-shift lever shaft is rotatably driven by means of a linear drive means for effecting a back and forth movement of said gear-shift sleeve means.

4. The apparatus according to claim 3, wherein a limit-value switch for detecting a shifting force is provided between said linear drive means for effecting a back and forth movement of said gear-shift sleeve means and means on said gear-shift lever shaft, which limit-value switch turns off the apparatus when a pregiven shifting force has been exceeded.

5. The apparatus according to claim 1, wherein a shift fork is mounted on an elongated gear-shift bar which extends parallel to said driven shaft, which gear-shift bar can be moved axially by means of a linear drive for effecting a back and forth movement of said gear-shift sleeve.

6. The apparatus according to claim 5, wherein a limit-value switch for detecting the shifting force is provided between said linear drive means for effecting a back and forth movement of said gear-shift sleeve and said gear-shift bar, which limit-value switch turns off the apparatus when a pregiven shifting force has been exceeded.

7. An apparatus according to claim 1, wherein a limit-value switch for detecting occurring oscillations is provided on said frame, which limit-value switch turns off the apparatus when a pregiven value is exceeded.

8. The apparatus according to claim 1, wherein a mounting means for said at least one of said second transmission gear and said second clutch ring is connected to said collection and evaluating means for detecting an axial force occurring during a shifting and synchronizing operation, which collecting and evaluating means is arranged between said mounting means and said frame.

9. The apparatus according to claim 1, wherein a mounting means for said at least one of said second transmission gear and said second clutch ring is connected to said collecting and evaluating means for detecting a friction moment occurring during a shifting and synchronizing operation, said mounting means including a lever supported on said collecting and evaluating means.

10. The apparatus according to claim 1, wherein said frame supporting said drive shaft and said driven shaft, and a mounting means supporting at least one of a gear-shift lever shaft and a gear-shift bar are formed at least partially by a housing means surrounding said synchronizing system to be tested, which housing means has on at least one side an access opening enabling loading and observation, which access opening can be closed off by a cover member secured with a limit switch.

11. In a method for the testing of synchronizing systems designated for use with gear-shift mechanisms in vehicle transmissions and for the purpose of determining factors influencing at least one of performance, design, materials, lubricants and temperature, said synchronizing system consisting of at least one of two transmission gears and one of two clutch rings, two synchronizing rings and a gear-shift sleeve, the improvement comprising the following method steps:

(a) mounting at least one of said two transmission gears and a clutch ring together with an associated synchronizing ring on a drive shaft equipped with a first flywheel mass, and mounting another of said two transmission gears and a further clutch ring together with a further associated synchronizing ring on a fixed frame and mounting a gear-shift sleeve axially between at least one of the two transmission gears and the two respectively associated clutch rings on a driven shaft equipped with a second flywheel mass;

(b) rotating the drive shaft with said at least one of said two transmission gears and a respective one of the clutch rings associated therewith;

(c) activating a first shifting and synchronizing operation so that said driven shaft together with said second flywheel mass is coupled with said drive shaft by an axial movement of said gear-shift sleeve so that said driven shaft is accelerated to a driving speed;

(d) activating a second shifting and synchronizing operation so that said driven shaft rotating at said driving speed is coupled with the frame-fixed other transmission gear by an axial movement of the gear-shift sleeve so that said driven shaft is decelerated until standstill;

(e) repeating method steps (c) and (d) until a pregiven number of shifting and synchronizing operations have been carried out, with the required measurement data pertaining to friction moment, axial force or other data being carried out during each shifting and synchronizing operation.

* * * * *

UNITED STATES PATENT AND TRADEMARK OFFICE
CERTIFICATE OF CORRECTION

PATENT NO. : 5 003 817
DATED : April 2, 1991
INVENTOR(S) : Hermann PFLAUM et al.

It is certified that error appears in the above-identified patent and that said Letters Patent is hereby corrected as shown below:

Column 5, line 35; change "shift" to ---shaft---.
Column 5, line 38; change "one" to ---on---.
Column 6, line 6; change "collection" to ---collecting---.

Signed and Sealed this

First Day of December, 1992

Attest:

DOUGLAS B. COMER

Attesting Officer     Acting Commissioner of Patents and Trademarks